(12) United States Patent
Matsuzaki et al.

(10) Patent No.: US 7,882,777 B2
(45) Date of Patent: Feb. 8, 2011

(54) HYDRAULIC PRESSURE CONTROL APPARATUS AND HYDRAULIC CIRCUIT

(75) Inventors: Takeharu Matsuzaki, Kariya (JP); Shigeto Nakajima, Nagano (JP)

(73) Assignees: Kabushiki Kaisha Toyota Jidoshokki, Aichi-ken (JP); Nishina Industrial Co., Ltd., Nagano-ken (JP)

( * ) Notice: Subject to any disclaimer, the term of this patent is extended or adjusted under 35 U.S.C. 154(b) by 582 days.

(21) Appl. No.: 11/667,043

(22) PCT Filed: Nov. 8, 2005

(86) PCT No.: PCT/JP2005/020775
§ 371 (c)(1), (2), (4) Date: May 6, 2008

(87) PCT Pub. No.: WO2006/049343
PCT Pub. Date: May 11, 2006

(65) Prior Publication Data
US 2008/0257142 A1    Oct. 23, 2008

(30) Foreign Application Priority Data
Nov. 8, 2004    (JP)    ............................ 2004-323232

(51) Int. Cl.
*F15B 13/04*    (2006.01)
(52) U.S. Cl. .................................................. 91/446
(58) Field of Classification Search ............... 60/444, 60/446
See application file for complete search history.

(56) References Cited
U.S. PATENT DOCUMENTS

| | | | |
|---|---|---|---|
| 3,774,635 A | 11/1973 | Farrell et al. | |
| 5,351,601 A | 10/1994 | Zeuner et al. | |
| 6,092,976 A | 7/2000 | Kamiya | |
| 6,164,415 A | 12/2000 | Takeuchi et al. | |
| 2004/0020196 A1 | 2/2004 | Goto et al. | |

FOREIGN PATENT DOCUMENTS

| | | |
|---|---|---|
| JP | 03-172602 | 7/1991 |
| JP | 2004-019873 | 1/2004 |

OTHER PUBLICATIONS

International Search Report for corresponding International PCT application No. PCT/JP2005/020775, published as WO 2006/049343 A1 on May 11, 2006.
Communication pursuant to Article 94(3) EPC for Application No. 05 803 426.5-1252, dated Apr. 15, 2010.

*Primary Examiner*—Michael Leslie
(74) *Attorney, Agent, or Firm*—Locke Lord Bissell & Liddell LLP

(57) ABSTRACT

A supply passage, a discharge passage, an actuator passage, and a spool bore are defined in a housing. The spool bore accommodates a spool and communicates with the supply passage, the discharge passage, and the actuator passage. Load pressure detection circuit sections of load pressure detection circuit are provided in correspondence with two switch. Each of the load pressure detection circuit sections detects load pressure when the actuator passage is connected to the supply passage. Each load pressure detection circuit section is defined by a through hole provided in the housing and connected to the spool bore. Check valves are each arranged in a corresponding one of the load pressure detection circuit sections. This simplifies the configuration of each load pressure detection circuit 21 and saves the space for arranging the load pressure detection circuit 21., resulting in a relatively compact housing.

12 Claims, 3 Drawing Sheets

HYDRAULIC PRESSURE CONTROL APPARATUS AND HYDRAULIC CIRCUIT

FIELD OF THE INVENTION

The present invention relates to hydraulic pressure control apparatuses having direction switch valves for controlling supply and drainage of hydraulic fluid to and from hydraulic actuators, which are spool valves switched between at least two positions in correspondence with movement of spools, and hydraulic circuits including the hydraulic pressure control apparatuses.

BACKGROUND OF THE INVENTION

Conventionally, hydraulic pressure control apparatuses having direction switch valves for controlling supply and drainage of hydraulic fluid to and from hydraulic actuators, which are spool valves, are known. A typical spool valve is switched between at least two positions in correspondence with movement of a spool. For example, Japanese Laid-Open Patent Publication Nos. 3-172602 and 2004-19873 each describe one such apparatus having a load pressure detection circuit for detecting load pressure in correspondence with operation of a direction switch valve. Also, the hydraulic pressure control apparatus of Japanese Laid-Open Patent Publication No. 2004-19873 has a check valve provided in the load pressure detection circuit for preventing a backflow of fluid.

However, in each of the apparatuses described in Japanese Laid-Open Patent Publications Nos. 3-172602 and 2004-19873, the load pressure detection circuit is formed as a single integrated circuit (see FIG. 1 of Japanese Laid-Open Patent Publication No. 3-172602 and FIG. 1 of Japanese Laid-Open Patent Publication No. 2004-19873). This complicates the configuration of the load pressure detection circuit. Further, a relatively large space is required for arranging the load pressure detection circuit in a housing in which the direction switch valve is incorporated, thus enlarging the housing. Also, in the apparatus of Japanese Laid-Open Patent Publication No. 2004-19873, the check valve must be arranged in the load pressure detection circuit, which is formed as the integrated circuit and thus configured complicatedly. It is thus difficult to install the check valve. This makes it further difficult to suppress complication of the configuration of the load pressure detection circuit and enlargement of the space for arranging the load pressure detection circuit.

DISCLOSURE OF THE INVENTION

Accordingly, it is an objective of the present invention to provide a hydraulic pressure control apparatus that simplifies the configuration of a load pressure detection circuit, thereby reducing the space accommodating the circuit and the dimensions of a housing in which the load pressure detection circuit is incorporated.

To achieve the foregoing and other objectives of the present invention, a hydraulic pressure control apparatus including a direction switch valve, a housing, a load pressure detection circuit, and check valves is provided. The direction switch valve controls supply and drainage of a hydraulic fluid to and from a hydraulic actuator. The direction switch valve is formed by a spool valve switched between at least two switch positions in correspondence with movement of a spool. The housing includes a supply passage for supplying the hydraulic fluid, a discharge passage for discharging the hydraulic fluid, an actuator passage connected to the hydraulic actuator, and a spool bore in which the spool is movably received. The spool bore is connected to the supply passage, the discharge passage, and the actuator passage. The load pressure detection circuit includes load pressure detection circuit sections. The load pressure detection circuit sections each correspond to one of the switch positions. Each of the load pressure detection circuit sections detects a load pressure when the actuator passage is connected to the supply passage. Each load pressure detection circuit section is defined by a through hole provided in the housing. The load pressure detection circuit sections communicate with the spool bore. Each check valve is arranged in one of the load pressure detection circuit sections.

The present invention also provides a hydraulic circuit that includes the above described hydraulic pressure control apparatus, and an additional direction switch valve for controlling an additional hydraulic actuator.

The present invention further provides a hydraulic circuit that includes two or more of the above described hydraulic pressure control apparatus, and a common load pressure detection circuit. The common load pressure detecting circuit is connected to every one of the load pressure detection circuit sections provided in the hydraulic pressure control apparatuses.

DETAILED DESCRIPTION OF THE PREFERRED EMBODIMENTS.

An embodiment of the present invention will now be described with reference to the attached drawings. The embodiment may be applied generally to hydraulic pressure control apparatuses having direction switch valves for controlling supply and drainage of hydraulic fluid to and from hydraulic actuators, which are spool valves. The spool valves are switched between at least two positions in correspondence with movement of spools. The embodiment may also be applied generally to hydraulic circuits including the aforementioned hydraulic pressure control apparatuses. In the following description, the embodiment is applied to, by way of example, a hydraulic circuit formed in a forklift for driving different hydraulic actuators serving as loading devices and hydraulic pressure control apparatuses provided in the hydraulic circuits. However, the present invention is not limited to such applications.

Figure 1:
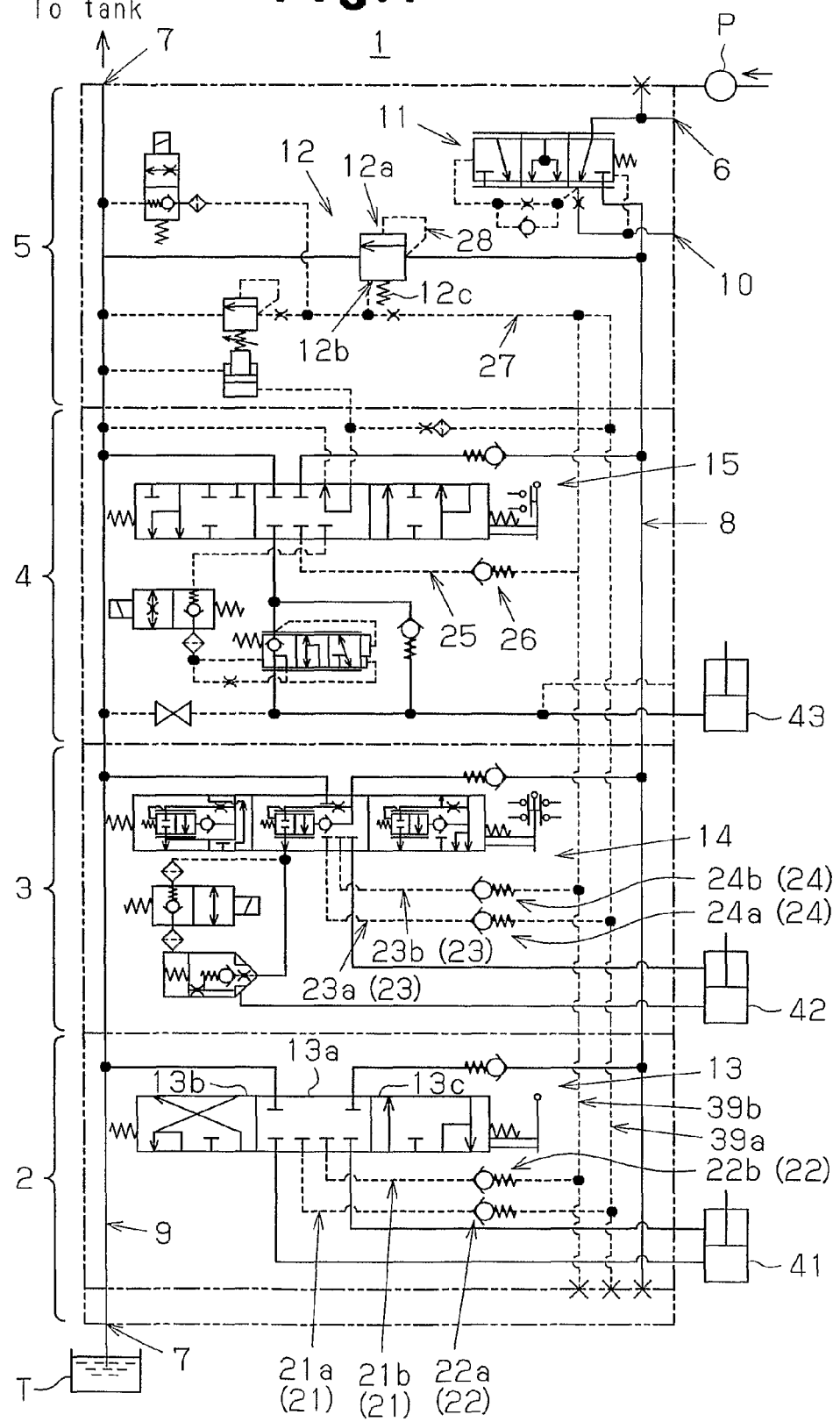
FIG. 1 is a diagram representing a hydraulic circuit according to an embodiment of the present invention.

FIG. 1 is a diagram representing a hydraulic circuit 1 of the illustrated embodiment. The hydraulic circuit 1 of FIG. 1 is applied to a loading device of a forklift (neither is shown). The hydraulic circuit 1 includes an attachment unit 2, a tilt unit 3, a lift unit 4, and an inlet unit 5. The inlet unit 5 has a pump port 6 connected to a hydraulic pump P. The hydraulic circuit 1 includes a supply system 8 that receives hydraulic fluid through the pump port 6 and supplies the hydraulic fluid to the attachment unit 2, the tilt unit 3, and the lift unit 4. Further, the inlet unit 5 and the attachment unit 2 each include a tank port 7 connected to a tank T. The hydraulic circuit 1 includes a discharge system 9 connected to the tank ports 7. The discharge system 9 thus discharges the hydraulic fluid from the attachment unit 2, the tilt unit 3, the lift unit 4, and the inlet unit 5 into the tank T. Each of the attachment unit 2, the tilt unit 3, the lift unit 4, and the inlet unit 5 includes a housing formed by an independent cast body. The hydraulic circuit 1 is defined by arranging the housings continuously.

As shown in FIG. 1, a flow divider 11 is incorporated in the inlet unit 5. The flow divider 11 divides the flow of the hydraulic fluid to a flow to a priority flow port 10 and a flow to the supply system 8, while adjusting the flow rate of the hydraulic fluid sent to the pump port 6. The priority flow port 10 is connected to a non-illustrated power steering circuit (a priority flow circuit). Further, the inlet unit 5 includes a pressure compensation valve 12 for adjusting the flow rate of the hydraulic fluid returned to the tank T (the flow rate of the hydraulic fluid supplied to the supply system 8) by changing a communication state of the supply system 8 with respect to the discharge system 9.

The attachment unit 2 (hereinafter, referred to also as a "hydraulic pressure control apparatus 2") configures a hydraulic pressure control apparatus for controlling operation of an attachment hydraulic actuator (hereinafter, an "attachment cylinder 41"), which is formed as, for example, a double-acting cylinder. The tilt unit 3 (hereinafter, referred to also as a "hydraulic pressure control apparatus 3") configures a hydraulic pressure control apparatus for controlling operation of a tilt cylinder 42, or a tilt hydraulic actuator formed as a double-acting cylinder. The lift unit 4 configures a hydraulic pressure control apparatus for controlling operation of a lift cylinder 43, which is a lift hydraulic actuator formed as a single-acting cylinder. The attachment unit 2 and the tilt unit 3 correspond to the hydraulic pressure control apparatuses according to the illustrated embodiment. That is, the hydraulic circuit 1 includes two hydraulic pressure control apparatuses of the illustrated embodiment.

The units 2, 3, 4, other than the inlet unit 5, include direction switch valves 13, 14, 15, respectively. Each of the direction switch valves 13, 14, 15 controls operation of the corresponding hydraulic actuator by adjusting supply and drainage of hydraulic fluid to and from the actuator, to which a prescribed port of the associated unit 2, 3, 4 is connected. Each direction switch valve 13, 14, 15 configures a spool valve switched between two positions in correspondence with movement of a spool. For example, the direction switch valve 13 is switched between two positions, a first switch position 13b and a second switch position 13c, with respect to a neutral position 13a. The direction switch valve 15 controls supply and drainage of the hydraulic fluid to and from the hydraulic actuator (the lift cylinder 43) other than the hydraulic actuators corresponding to the hydraulic pressure control apparatuses 2, 3.

Further, the units 2, 3, 4 each include a load pressure detection circuit 21, 23, 25 for detecting load pressure in correspondence with operation of the associated direction switch valves 13, 14, 15. Each of the load pressure detection circuits 21, 23, 25 includes a check valve 22, 24, 26. The load pressure detection circuit 21 of the attachment unit 2 has two load pressure detection circuit sections 21a, 21b associated respectively with the two switch positions 13b, 13c. The load pressure detection circuit sections 21a, 21b include check valve portions 22a, 22b, respectively. Similarly, the load pressure detection circuit 23 of the tilt unit 3 has two load pressure detection circuit sections 23a, 23b associated respectively with the two switch positions. The load pressure detection circuit sections 23a, 23b include check valve portions 24a, 24b, respectively.

The hydraulic circuit 1 includes a common load pressure detection circuit 27. The load pressure detection circuits 21, 23, 24 of the units 2, 3, 4 are connected to the common load pressure detection circuit 27. The common load pressure detection circuit 27 is defined in the housing of the inlet unit 5.

Referring to FIG. 1, the pressure compensation valve 12 of the inlet unit 5 has a first pilot chamber 12a and a second pilot chamber 12b. The first pilot chamber 12a receives the pressure of the hydraulic fluid in a passage 28 into which the hydraulic fluid flows from the supply system 8. The second pilot chamber 12b receives the pressure of the hydraulic fluid in the common load pressure detection circuit 27 into which the hydraulic fluid flows from the load pressure detection circuits 21, 23, 25 through the corresponding direction switch valves 13, 14, 15. The second pilot chamber 12b also receives the urging force of a spring 12c. The pressure compensation valve 12 controls the flow rate of the hydraulic fluid sent to the supply system 8 in correspondence with the urging force generated by the first pilot chamber 12a and the urging force generated by the second pilot chamber 12b. More specifically, the pressure compensation valve 12 changes a communication state of the supply system 8 with respect to the discharge system 9 in correspondence with the urging forces generated by the first and second pilot chambers 12a, 12b. In this manner, the pressure compensation valve 12 controls the flow rate of the hydraulic fluid sent to the direction switch valves 13, 14, 15 through the supply system 8. Therefore, if at least one of the direction switch valves 13 to 15 is operated and load pressure is detected in at least one of the load pressure detection circuits 21, 23, 25, the urging force generated by the second pilot chamber 12b increases. This causes the pressure compensation valve 12 to operate to restrict the flow rate of the hydraulic fluid flowing from the supply system 8 to the discharge system 9. Accordingly, the hydraulic fluid is supplied to the operated direction switch valve reliably in correspondence with the load generated by the corresponding hydraulic actuator.

Figure 2:
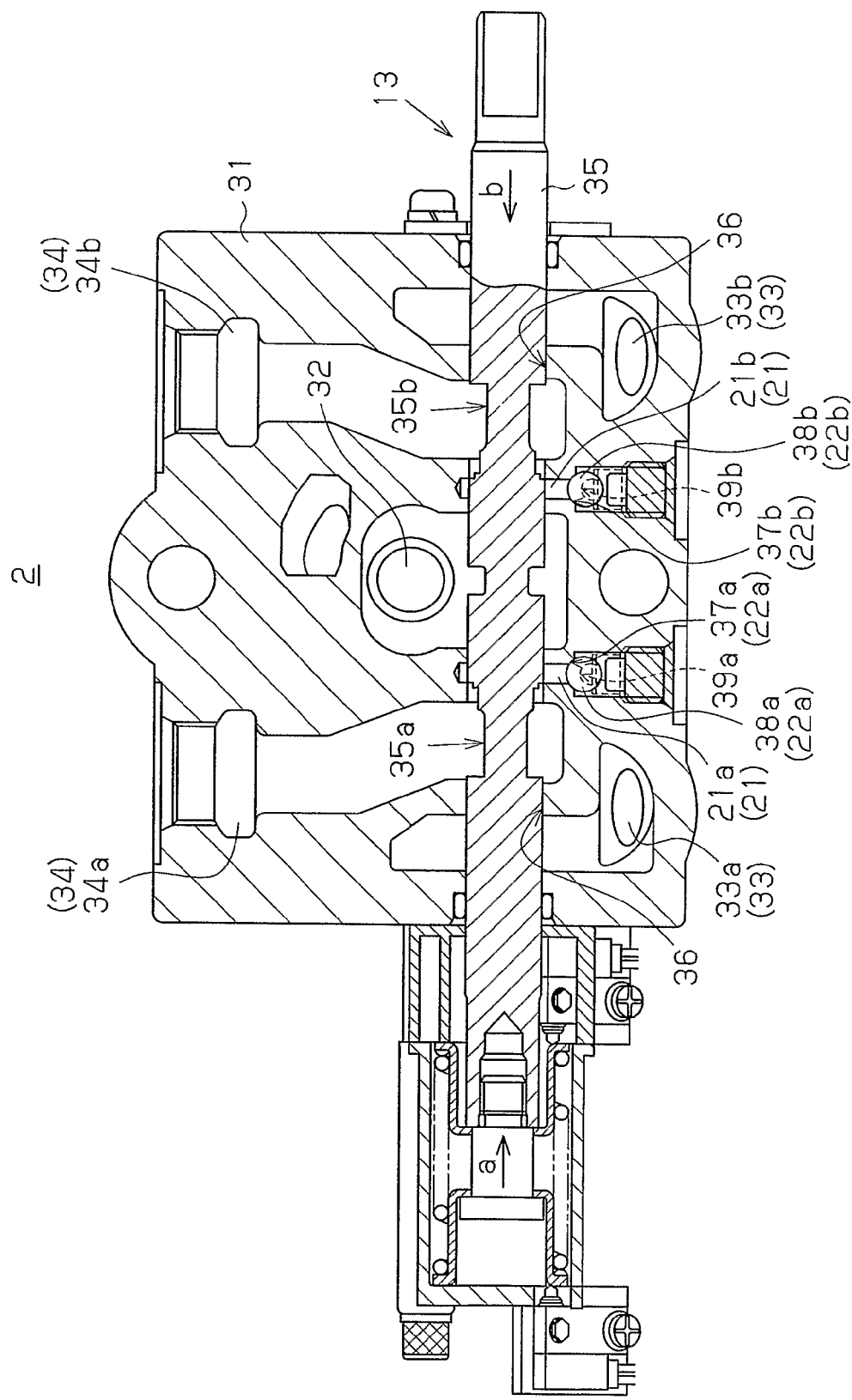
FIG. 2 is a cross-sectional view showing a hydraulic pressure control apparatus arranged in the hydraulic circuit of FIG. 1.

Next, the hydraulic pressure control apparatus of the illustrated embodiment will be explained regarding the attachment unit 2 (the hydraulic pressure control apparatus 2), by way of example. FIG. 2 is a cross-sectional view showing the hydraulic pressure control apparatus 2 held in a state corresponding to the neutral position 13a (see FIG. 1). As shown in the drawing, the hydraulic pressure control apparatus 2 includes a housing 31, the direction switch valve 13, the load pressure detection circuits sections 21a, 21b, and the check valve portions 22a, 22b.

The housing 31 includes different passages, including a supply passage 32 for supplying hydraulic fluid, a discharge passage 33 for discharging the fluid to the tank T, and an actuator passage 34 communicating with the attachment cylinder 41. The supply passage 32 forms a part of the supply system 8 and the discharge passage 33 forms a part of the discharge system 9. The discharge passage 33 includes a first discharge passage section 33a and a second discharge passage section 33b. Each of the supply passage 32 and the discharge passage 33 communicates with a spool bore 36 through a corresponding communication passage. The actuator passage 34 includes a first actuator passage section 34a and a second actuator passage section 34b. Each of the first and second actuator passage sections 34a, 34b communicates with a corresponding one of fluid chambers (not shown) defined in the attachment cylinder 41, which is formed as the double-acting cylinder.

Figure 3:
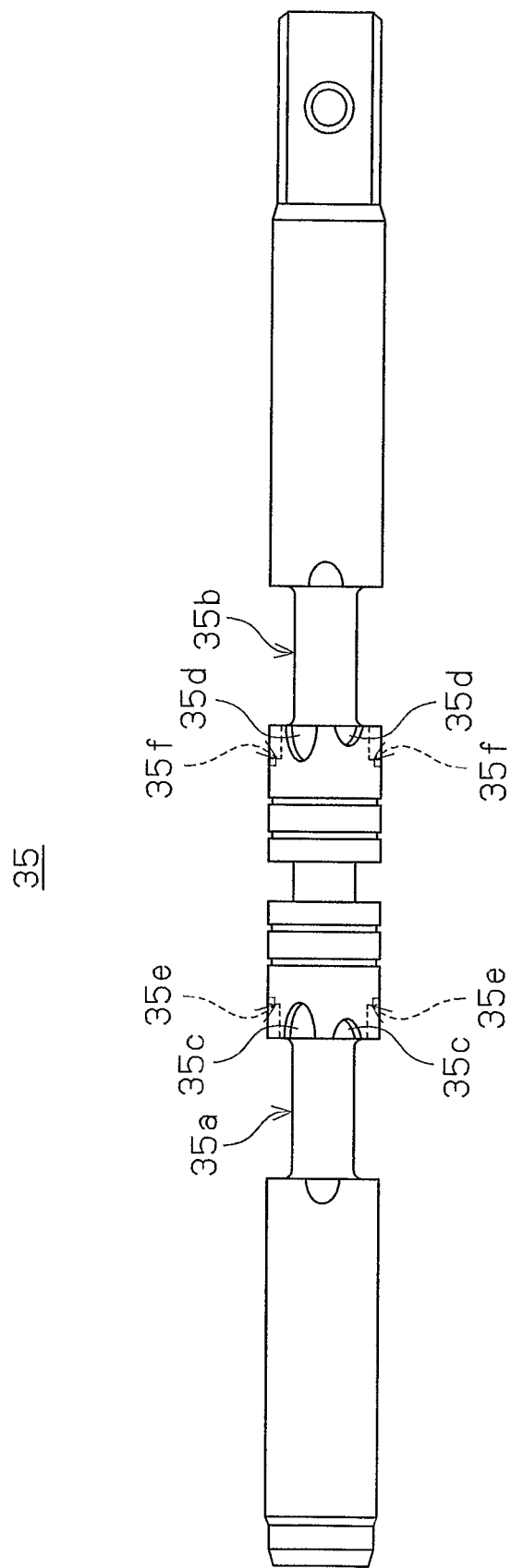
FIG. 3 is a front view showing a spool incorporated in the hydraulic pressure control apparatus of FIG. 2.

The direction switch valve 13 includes a spool 35 and the spool bore 36 defined in the housing 31. The spool 35 is movably received in the spool bore 36. The spool bore 36 is defined in such a manner that the supply passage 32, the discharge passage 33, and the actuator passage 34 (the actuator passage sections 34a, 34b) communicate with one another. As shown in FIG. 3, the spool 35 includes a first land portion 35a and a second land portion 35b each having a relatively small diameter with respect to the remaining portion of the spool 35. Further, a plurality of notches 35c, 35d, 35e, and 35f are defined in the spool 35 for adjusting communication timings, which will be described later.

Referring to FIG. 2, the load pressure detection circuit 21 detects load pressure when the actuator passage 34 is connected to the supply passage 32. As has been described, the load pressure detection circuit 21 has the load pressure detection circuit section 21a corresponding to the first switch position 13b (see FIG. 1) and the load pressure detection circuit section 21b corresponding to the second switch position 13c (FIG. 1). Each of the load pressure detection circuit sections 21a, 21b is a machined through hole defined in the housing 31 and communicates with the spool bore 36. The through holes defining the load pressure detection circuit sections 21a, 21b (hereinafter, referred to also as "through holes 21a, 21b") and the spool bore 36 are located on a common plane (a plane corresponding to the cross-section of FIG. 2).

Passages 39a, 39b communicate with the through holes 21a, 21b, respectively, extending perpendicular to the through holes 21a, 21b. The through holes 21a, 21b communicate with the common load pressure detection circuit 27 of the inlet unit 5 through the corresponding passages 39a, 39b. Each of the passages 39a, 39b communicates with the corresponding through hole 21a, 21b at a position downstream from the associated check valve portion 22a, 22b. Further, the load pressure detection circuit section 23a of the tilt unit 3 and the load pressure detection circuit 25 of the lift unit 4 communicate with the passage 39a (see FIG. 1). Likewise, the load pressure detection circuit section 23b of the tilt unit 3 communicates with the passage 39b (see FIG. 1).

As shown in FIG. 2, the check valve portion 22a is arranged in the load pressure detection circuit section 21a, or the through hole 21a. The check valve portion 22b is arranged in the load pressure detection circuit section 21b, or the through hole 21b. The check valve portion 22a includes a valve seat 37a and a valve body (a ball) 38a. The valve seat 37a is formed by a stepped portion defined in the wall of the through hole 21a. The valve body 38a is received in the through hole 21a. Similarly, the check valve portion 22b includes a valve seat 37b and a valve body (a ball) 38b. The valve seat 37b is formed by a stepped portion defined in the wall of the through hole 21b. The valve body 38b is received in the through hole 21b.

The operation of the hydraulic pressure control apparatus 2, which is configured as above-described, will hereafter be explained. The direction switch valve 13 is switched from the neutral position 13a of FIG. 2 to the first switch position 13b (FIG. 1) through movement of the spool 35 in a direction indicated by arrow a of FIG. 2. More specifically, after the spool 35 starts to move, communication between the first actuator passage section 34a and the load pressure detection circuit section 21a is first permitted through the notch 35e (see FIGS. 2 and 3). The load pressure is thus detected in the load pressure detection circuit section 21a. The direction switch valve 13 is provided with a rotation stopper for restricting circumferential rotation of the spool 35 in the spool bore 36. This reliably permits communication between the first actuator passage section 34a and the load pressure detection circuit section 21a through the notch 35e, in correspondence with the movement of the spool 35. As the spool 35 further moves, connection between the supply passage 32 and the first actuator passage section 34a is permitted first through the notch 35c and then through the first land portion 35a. The direction switch valve 13 is thus completely switched to the first switch position 13b at which the hydraulic fluid is supplied to one of the fluid chambers defined in the attachment cylinder 41. When the direction switch valve 13 is held at the first switch position 13b, communication between the first actuator passage section 34a and the load pressure detection circuit section 21a is maintained through the first land portion 35a. Therefore, the hydraulic fluid is introduced into the common load pressure detection circuit 27 through the check valve portion 22a and the passage 39a, thus applying the urging force to the second pilot chamber 12b of the pressure compensation valve 12. Further, with the direction switch valve 13 held at the first switch position 13b, communication between the second actuator passage section 34b and the second discharge passage section 33b is permitted through the second land portion 35b. The hydraulic fluid is thus discharged from the other one of the fluid chambers in the attachment cylinder 41 to the discharge system 9.

The direction switch valve 13 is switched from the neutral position 13a of FIG. 2 to the second switch position 13c (see FIG. 1) through movement of the spool 35 in a direction indicated by arrow b in FIG. 2. More specifically, after the spool 35 starts to move, communication between the second actuator passage section 34b and the load pressure detection circuit section 21b is permitted through the notch 35f (see FIGS. 2 and 3). The load pressure is thus detected in the load pressure detection circuit section 21b. As the spool 35 further moves, communication between the supply passage 32 and the second actuator passage section 34b is permitted first through the notch 35d and then through the second land portion 35b. In this manner, the direction switch valve 13 is completely switched to the second switch position 13c at which the hydraulic fluid is supplied to the attachment cylinder 41. When the direction switch valve 13 is held at the second switch position 13c, communication between the second actuator passage section 34b and the load pressure detection circuit section 21b is maintained through the second land portion 35b. Therefore, the hydraulic fluid is introduced into the common load pressure detection circuit 27 through the check valve portion 22b and the passage 39b, thus applying the urging force to the second pilot chamber 12b of the pressure compensation valve 12. Further, with the direction switch valve 13 held at the second switch position 13c, communication between the first actuator passage section 34a and the first discharge passage section 33a is permitted through the first land portion 35a. The hydraulic fluid is thus discharged from the attachment cylinder 41 to the discharge system 9.

As has been described, in the hydraulic pressure control apparatus 2 of the illustrated embodiment, the load pressure detection circuit sections 21a, 21b, each of which detects load pressure, are provided in correspondence with the switch positions 13b, 13c, as the through holes communicating with the spool bore 36. Accordingly, a simply configured load pressure detection circuit is easily provided for each of the switch positions 13b, 13c. Further, the simple configuration of each load pressure detection circuit section 21a, 21b makes it easy to arrange the corresponding check valve portion 22a, 22b in the load pressure detection circuit section 21a, 21b. Accordingly, the hydraulic pressure control apparatus 2 reduces the space occupied by the load pressure detection circuit 21 by simplifying the configuration of the load pressure detection circuit 21, and decreases the size of the housing 31 in which the load pressure detection circuit 21 is received.

The hydraulic pressure control apparatus 3 has the same advantages as those of the hydraulic pressure control apparatus 2.

Further, in the hydraulic pressure control apparatus 2, the spool bore 36 and the through holes 21a, 21b, which define the load pressure detection circuit 21, are located on the same plane. This reduces the height of the housing 31 and the housing 31 becomes compact. The housing 31 is thus further reduced in size. Also, if the hydraulic pressure control apparatuses 2, 3 are arranged continuously for forming the hydraulic circuit 1, like the illustrated embodiment, the hydraulic circuit 1 is reduced in size since the height of each hydraulic pressure control apparatus 2, 3 is relatively small.

In the hydraulic pressure control apparatus 2, the check valve 22 includes the valve seat 37a, 37b and the valve body 38a, 38b. The valve seat 37a, 37b is defined as a part of the wall of the corresponding through hole forming the load pressure detection circuit 21. The valve body 38a, 38b is received in the through hole. That is, the configuration of the check valve 22, which is arranged in the load pressure detection circuit 21, is relatively simple. This further reduces the space in the housing 31 occupied by the load pressure detection circuit 21 in which the check valve 22 is arranged. Also, the load pressure detection circuit 21 and the check valve 22 are efficiently installed in the housing 31. The housing 31 thus may be further reduced in size.

The hydraulic circuit 1 of the illustrated embodiment has the same advantages as those of the hydraulic pressure control apparatus 2. More specifically, the hydraulic circuit 1 has the hydraulic pressure control apparatuses 2, 3 having the corresponding direction switch valves 13, 14 switched between two positions. The hydraulic circuit 1 also has the direction switch valve 15 different than the direction switch valves 13, 14. The size of the hydraulic circuit 1 as a whole thus becomes relatively small. In other words, the hydraulic circuit 1 includes the hydraulic pressure control apparatuses 2, 3 having the corresponding direction switch valves 13, 14 for controlling the associated double-acting cylinders, or the associated hydraulic actuators. The hydraulic circuit 1 further includes the direction switch valve 15 for controlling the single acting cylinder, or the hydraulic actuator. The configuration of the hydraulic circuit 1 reduces the size of the hydraulic circuit 1.

In the illustrated embodiment, since each of the hydraulic pressure control apparatuses 2, 3 is reduced in size, the hydraulic circuit 1 as a whole is greatly reduced in size. Further, the load pressure detection circuits 21, 23, each having the check valve 22, 24, 26 are merged into the single common load pressure detection circuit 27, forming a relatively simple circuitry. This prevents a backflow of the hydraulic fluid and thus maximizes the load pressure detected in the load pressure detection circuits 21, 23, 25. Further, for merging the load pressure detection circuits 21, 23, 25 into the common load pressure detection circuit 27, the load pressure detection circuits 21, 23, 25 are simply connected to the common load pressure detection circuit 27. This results in a relatively simple circuitry that includes the load pressure detection circuits 21, 23, 25, in terms of the hydraulic circuit 1 as a whole. The hydraulic circuit 1 is further reduced in size.

Although the embodiment of the present invention has been explained so far, the invention is not restricted to the illustrated embodiment. It is to be understood that the invention may be embodied in various other modified forms without departing from the scope of the invention. For example, the present invention may be embodied as the following modifications.

(1) The present invention is not limited to the application to the hydraulic circuit of the illustrated embodiment, which includes a number of units. That is, as long as the hydraulic circuit includes at least one hydraulic pressure control apparatus of the illustrated embodiment, a number of hydraulic pressure control apparatuses or different direction switch valves may be provided in the hydraulic circuit, as needed.

(2) In the illustrated embodiment, when the direction switch valve is switched to a different position, load pressure detection in the load pressure detection circuit is started before communication between the supply passage and the actuator passage is permitted. However, the present invention is not limited to this. That is, the points in time for starting the load pressure detection or permitting the communication between the supply passage and the actuator passage may be changed (the point in time for starting the load pressure detection may coincide with the point in time for permitting the communication between the supply passage and the actuator passage).

(3) The structures for connecting the through holes to the common load pressure detection circuit and the configuration of each check valve are not limited to the corresponding structures or configuration of the illustrated embodiment but may be modified in various other forms.

The invention claimed is:

1. A hydraulic pressure control apparatus comprising:
   a direction switch valve for controlling supply and drainage of a hydraulic fluid to and from a hydraulic actuator, the direction switch valve being formed by a spool valve switched between at least two switch positions in correspondence with movement of a spool;
   a housing including a supply passage for supplying the hydraulic fluid, a discharge passage for discharging the hydraulic fluid, an actuator passage connected to the hydraulic actuator, and a spool bore in which the spool is movably received, the spool bore being connected to the supply passage, the discharge passage, and the actuator passage;
   a load pressure detection circuit including load pressure detection circuit sections, the load pressure detection circuit sections each corresponding to one of the switch positions, each of the load pressure detection circuit sections detecting a load pressure when the actuator passage is connected to the supply passage, each load pressure detection circuit section being defined by a through hole provided in the housing, the load pressure detection circuit sections communicating with the spool bore; and
   check valves each arranged in one of the load pressure detection circuit sections, each of the check valves includes a valve seat and a valve body, the valve seat being formed as a portion of a wall of the through hole defining the corresponding one of the load pressure detection circuit sections, the valve body being received in the through hole.

2. The apparatus according to claim 1, wherein the spool bore is located on the same plane as the through holes defining the load pressure detection circuit sections.

3. The apparatus according to claim 1, wherein the actuator passage includes a first actuator passage section and a second actuator passage section defined in the housing, wherein the at least two switch positions include a first switch position at which the supply passage is connected to the first actuator passage section and a second switch position at which the supply passage is connected to the second actuator passage section.

4. A hydraulic circuit comprising:
at least one hydraulic pressure control apparatus according to claim 1; and
an additional direction switch valve for controlling an additional hydraulic actuator.

5. A hydraulic circuit comprising:
a plurality of hydraulic pressure control apparatuses according to claim 1; and
a common load pressure detection circuit, the common load pressure detecting circuit being connected to every one of the load pressure detection circuit sections provided in the hydraulic pressure control apparatuses.

6. The apparatus according to claim 2, wherein the actuator passage includes a first actuator passage section and a second actuator passage section defined in the housing, wherein the at least two switch positions include a first switch position at which the supply, passage is connected to the first actuator passage section and a second switch position at which the supply passage is connected to the second actuator passage section.

7. A hydraulic circuit comprising:
at least one hydraulic pressure control apparatus according to claim 2; and
an additional direction switch valve for controlling an additional hydraulic actuator.

8. A hydraulic circuit comprising:
at least one hydraulic pressure control apparatus according to claim 3; and
an additional direction switch valve for controlling an additional hydraulic actuator.

9. A hydraulic circuit comprising:
one hydraulic pressure control apparatus according to claim 6; and
an additional direction switch valve for controlling an additional hydraulic actuator.

10. A hydraulic circuit comprising:
a plurality of hydraulic pressure control apparatuses according to claim 2; and
a common load pressure detection circuit, the common load pressure detecting circuit being connected to every one of the load pressure detection circuit sections provided in the hydraulic pressure control apparatuses.

11. A hydraulic circuit comprising:
a plurality of hydraulic pressure control apparatuses according to claim 3; and
a common load pressure detection circuit, the common load pressure detecting circuit being connected to every one of the load pressure detection circuit sections provided in the hydraulic pressure control apparatuses.

12. A hydraulic circuit comprising:
a plurality of hydraulic pressure control apparatuses according to claim 6; and
a common load pressure detection circuit, the common load pressure detecting circuit being connected to every one of the load pressure detection circuit sections provided in the hydraulic pressure control apparatuses.

* * * * *